United States Patent [19]

Irnich

[11] Patent Number: 5,667,196
[45] Date of Patent: Sep. 16, 1997

[54] SLIDE VALVE TO CLOSE LARGE FLUID CONDUITS, IN PARTICULAR DOUBLE-DISK SLIDE VALVE

[75] Inventor: Franz-Josef Irnich, Hürtgenwal-Gey, Germany

[73] Assignee: Zimmermann & Jansen GmbH, Germany

[21] Appl. No.: 535,148

[22] PCT Filed: Jan. 19, 1995

[86] PCT No.: PCT/EP95/00185

§ 371 Date: Jan. 16, 1996

§ 102(e) Date: Jan. 16, 1996

[87] PCT Pub. No.: WO95/23306

PCT Pub. Date: Aug. 31, 1995

[30] Foreign Application Priority Data

Feb. 23, 1994 [DE] Germany .................. 44 05 836.5

[51] Int. Cl.⁶ ........................................... F16K 3/16
[52] U.S. Cl. ................................. 251/193; 251/326
[58] Field of Search ........................... 251/193, 195, 251/196, 326

[56] References Cited

U.S. PATENT DOCUMENTS 3,527,440  9/1970  Presslauer .................. 251/193 X
3,768,773 10/1973  Stephens .................... 251/193 X
3,907,250  9/1975  Kane ........................ 251/193 X
4,235,256 11/1980  Crawshay ...................... 137/240
4,482,296 11/1984  Bachmann ...................... 251/326

FOREIGN PATENT DOCUMENTS 8706251  4/1887  Germany .
 529439 11/1931  Germany .
2342448  3/1975  Germany .
3609635  9/1987  Germany .
4011274  1/1991  Germany .

Primary Examiner—John Fox
Attorney, Agent, or Firm—Andrus, Sceales, Starke & Sawall

[57] ABSTRACT

Slide valve to close large fluid conduits, in particular double-disk slide valve, with a slide gate (14) disposed within a valve housing (11) so that it can move transverse to the fluid conduit, and arranged like spectacles with a shut-off plate (15) on one side and a pipe bridge (16) on the other. The shut-off plate (15) can be moved into the fluid conduit when the slide valve is closed, and the pipe bridge (16) when it is opened. The slide gate (14) is supported in the valve housing (11) on roller bearings in such a way that the bearing rollers (21, 22) hold the slide gate (14) radially with respect to its direction of movement (23) on all sides. (FIG. 1)

16 Claims, 3 Drawing Sheets

SLIDE VALVE TO CLOSE LARGE FLUID CONDUITS, IN PARTICULAR DOUBLE-DISK SLIDE VALVE

BACKGROUND OF THE INVENTION

The invention relates to a slide valve to close large fluid conduits, in particular a double-disk slide valve, according to the precharacterizing clause of claim 1.

Slide valves of this kind, in particular double-disk or spectacle-type slide valves, are generally known, in particular due to the applicant. In this regard reference is made to the prospectus No. 103 I/85, Spectacle-Type Valve II, of Zimmermann & Jansen GmbH, and to the German patent DE-C-40 11 274. The known double-disk valves are used when it is required that the flow aperture of the valve be sealed off from the surroundings, in particular from the interior of the valve housing, when the valve is in the open position. This is the case especially when the fluid is a gas contaminated by sublimating substances, because in the absence of a leakproof seal such substances could be deposited in parts of the housing and cause a complete blockage, thus preventing actuation of the valve. For similar reasons valves of this kind are used for gases that contain dust as well as for heavily contaminated liquid media, e.g. in coal-to-gas plants, combustion plants, chemical plants, pipelines and the like.

Because double-disk valves are heavy installations, it is important for the slide gate to be easily movable. Furthermore, the slideway should be so constructed that it is fully functional in any desired orientation of the valve, i.e. standing vertically, hanging vertically or lying horizontally, with no need for special structural alterations.

It is thus the object of the present invention to produce a slide valve, in particular a double-disk slide valve, the slide gate of which moves easily in its slideway while ensuring that the slideway remains functional regardless of the orientation of the installed valve.

SUMMARY OF THE INVENTION

This object is achieved by mounting the slide gate on roller bearings within the valve housing, in such a way that the rollers support the gate radially with respect to its movement direction, on all sides. The mounting of the slide gate on rollers ensures freedom of movement. The arrangement of the rollers allows the slide valve, and hence the gate, to be installed in any desired orientation, either standing upright, hanging vertically, or lying either horizontally or at an angle. Functionality in any orientation is preserved by the arrangement of the bearing rollers in accordance with the invention.

Preferred structural details of the principle of construction are provided in accordance with the invention. Of special interest includes having the slide gate is bounded on one narrow side by a guide member having an outer profile and configuration or shape, and preferably a polygonal round-rod or tubular pile, against which bearing rollers rotatably disposed in the valve housing can roll, the bearing rollers being disposed in an approximately star-shaped array with reference to the long axis of the profile. This arrangement ensures that the slide gate is held on all sides radially with respect to its direction of movement. On the opposite narrow side of the slide gate, it suffices to arrange the bearing rollers so that they roll against a flat surface.

The bearing rollers are preferably each individually adjustable against the associated longitudinal guide surface of the slide gate, so that the gate is guided longitudinally without play. Above all, this measure allows manufacturing tolerances to be compensated.

A feature independent of the above-mentioned roller mounting of the slide gate, but which can also be combined therewith, includes a construction in which the slide gate can be moved back and forth by a toothed-rack or chain-wheel drive. The latter drive comprising a chain attached to the gate on one side, preferably a narrow side, and a chain wheel that engages the chain and is operationally connected to a drive mechanism. The drive mechanism is preferably an electrical or hydraulic motor. The chain wheel is disposed in a housing flange-mounted, so as to form a gastight seal, on the valve housing, and the drive shaft operationally connected to the chain wheel leaves the chain-wheel housing through a gastight opening. Thus the chain-wheel drive mechanism can be mounted and removed with no leakage of gas into the valve or chain-wheel housings. Structural details of this embodiment are also described in claims 13 and 14 in connection with the illustrated embodiment.

Another embodiment is presented, which can be used either in combination with the above-mentioned construction or also independently thereof. In this embodiment of a slide valve, in particular a double-disk valve, the latter's pipe bridge comprises two sealing rings joined to each other by a compensator, so that when the valve is open the rings can be pressed by an expander (under spring tension) against corresponding sealing seats on the valve housing. The shut-off plate of the valve comprises two shut-off disks, which when the valve is closed are likewise pressed against the above-mentioned sealing seats on the valve housing by means of an expansion device. Spring elements can be used as expanders, just as for the above-mentioned sealing rings of the pipe bridge. However, it is also conceivable to expand the shut-off disks by means of the wedge-in-wedge construction, which is known per se. Instead of the embodiment just described, the double-disk valve can also be constructed without compensator and without expanders for the shut-off plate. In this case a movable sealing seat on the housing must be provided, in particular by means of a ring-shaped compensator.

The special aspect of the construction described above for a double-disk slide valve, which is already known per se, is that the sealing rings of the pipe bridge and/or the shut-off disks of the shut-off plate are held within a frame of the slide gate by adjustment screws disposed both radially and axially. The radially disposed adjustment screws are preferably arranged with the screw head slidably apposed to the frame of the slide gate. This provides an axial slide bearing for the expansion movement of the pipe-bridge sealing rings and the shut-off disks with a particularly simple construction, easily adjustable at the installation site. The axially disposed adjustment screws are advantageously positioned between the sealing rings and/or shut-off disks. They form a stop that determines the closest axial proximity to each other of the sealing rings or shut-off disks. In addition, they serve to center the sealing rings and shut-off disks axially when these are in the state of closest axial proximity.

BRIEF DESCRIPTION OF THE DRAWINGS

In the following, an exemplary embodiment of the double-disk or spectacle-type slide valve in accordance with the invention is described with reference to the attached drawings, wherein.

DESCRIPTION OF THE ILLUSTRATED EMBODIMENTS

Figure 1:
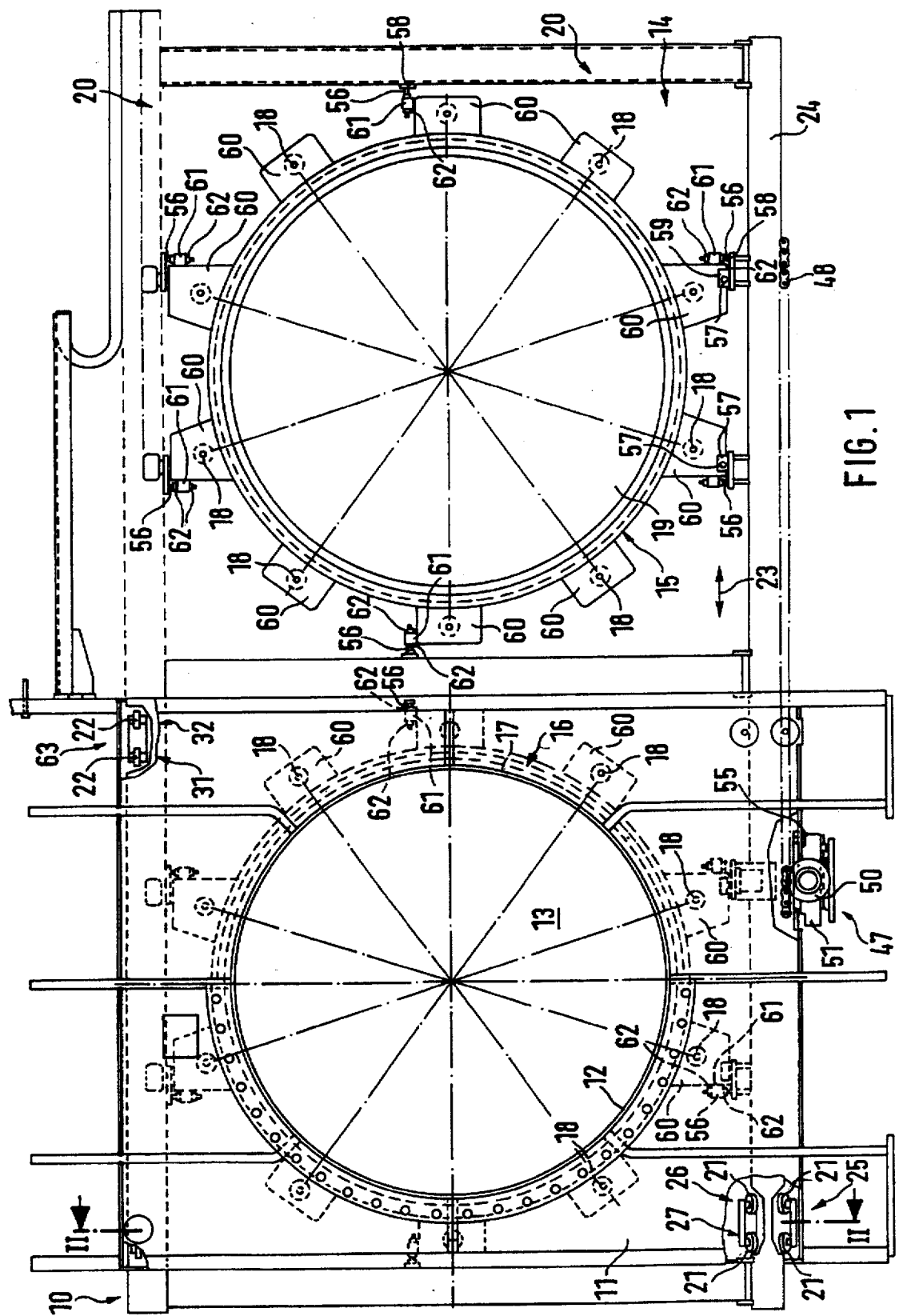
FIG. 1 shows a double-disk slide valve in accordance with the invention in front view.
Figure 2:
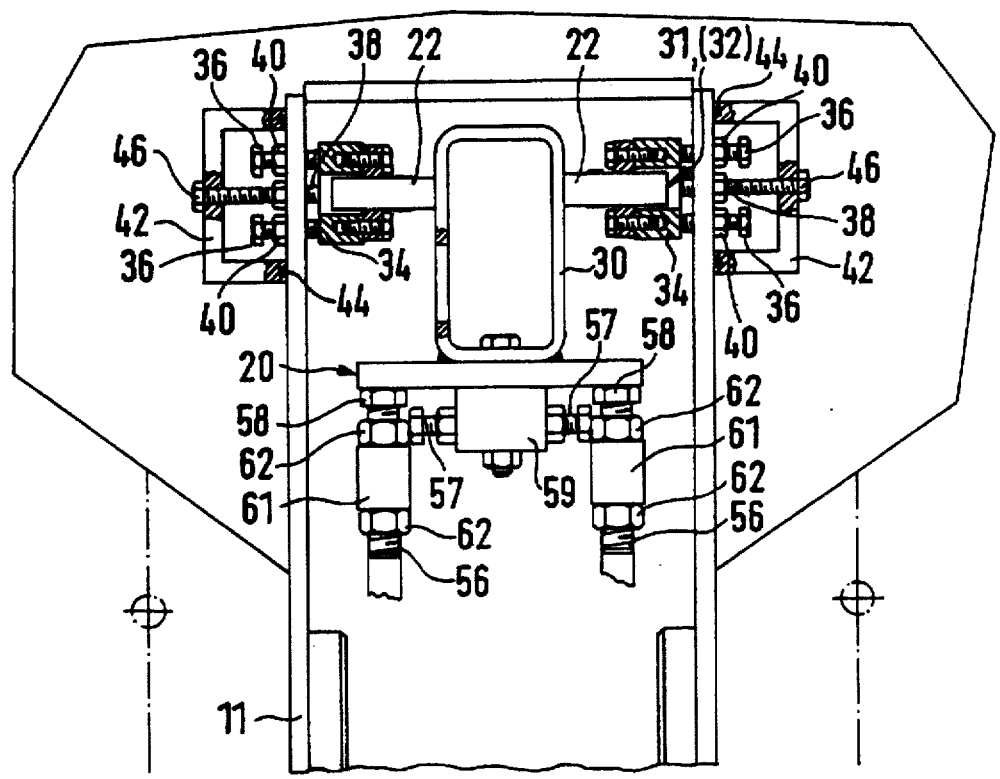
FIG. 2 shows the double-disk slide valve according to FIG. 1 in enlarged cross section in the regions of an upper and a lower roller bearing.
Figure 2:
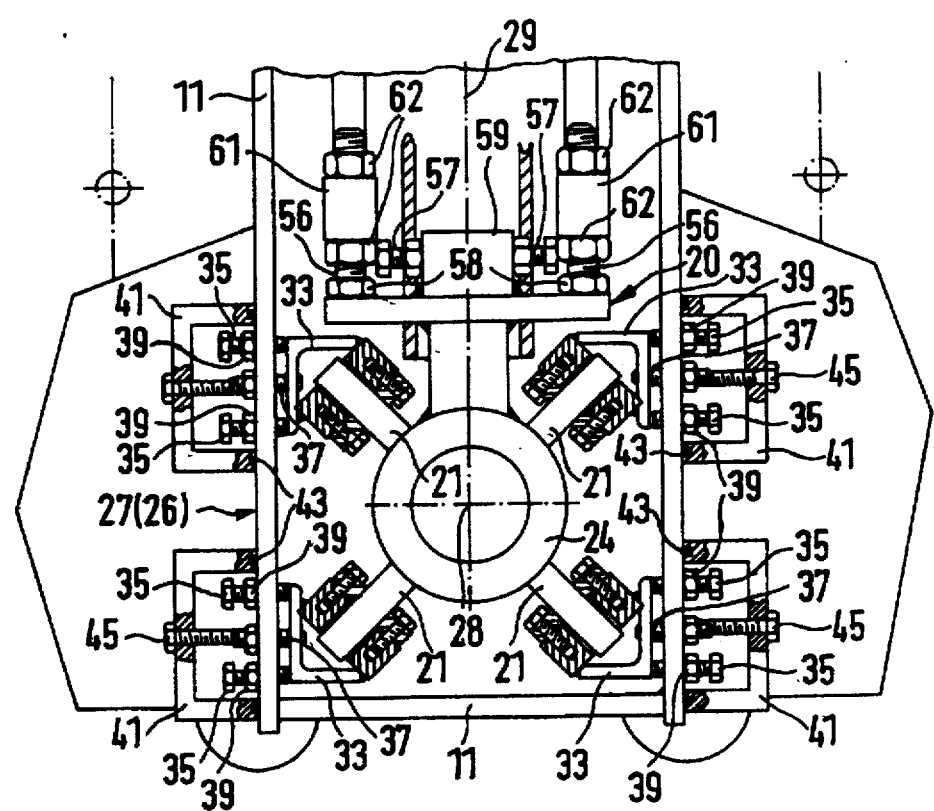
Figure 3:
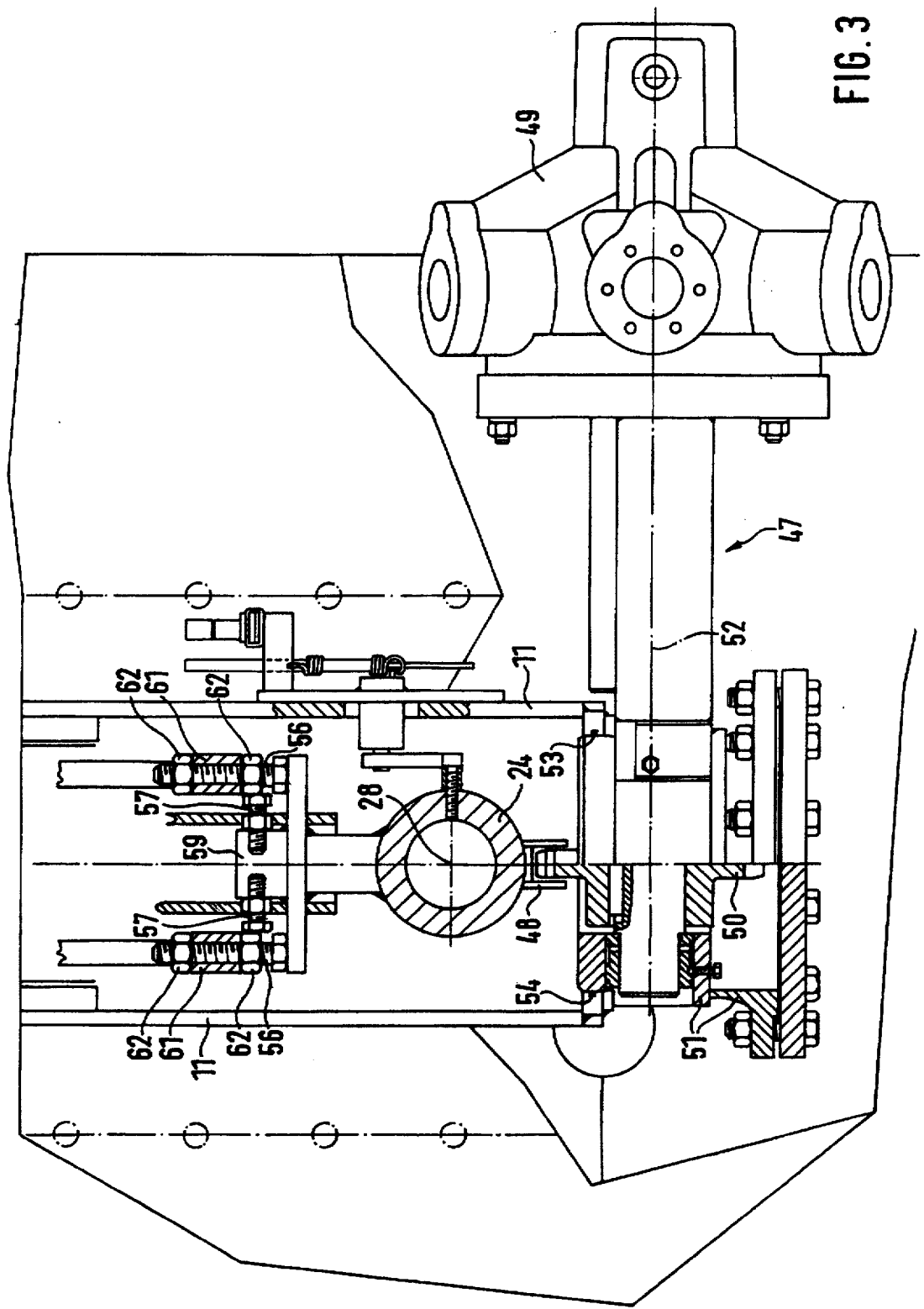
FIG. 3 is a section through the double-disk slide valve according to FIG. 1 in the region of a chain-wheel drive, enlarged.

The double-disk slide valve 10 shown in FIGS. 1 to 3 comprises a slab-like housing 11 with a central flow aperture 13 and two pipe supports 12, which are flange-mounted by their flat sides and bound the central flow aperture 13; on the inner surface of each pipe support 12 a sealing seat of the housing, not shown in detail, is formed or disposed. Between these sealing seats a slide gate 14 is so disposed that it can be slid back and forth within the slide-valve housing 11, in a direction transverse to the fluid conduit (not shown) and hence transverse to the long axis of the flow aperture 13. The slide gate 14 looks like a pair of spectacles, with a shut-off plate 15 and a pipe bridge 16 arranged side by side so that when the plate is moved into the closed position the shut-off plate 15 blocks the fluid conduit, i.e. occupies the flow aperture 13, and in the open position the pipe bridge 16 occupies the flow aperture. The latter position is shown in FIG. 1. The pipe bridge 16 comprises two sealing rings 17 joined together by a compensator, e.g. in the form of a corrugated pipe or the like, such that in the open position of the slide gate according to FIG. 1 the sealing rings 17 are pressed against corresponding sealing seats on the slide-valve housing 11 by expansion elements, in particular spring expanders 18, which are uniformly spaced around the circumference and when necessary can be compressed mechanically, pneumatically or in particular hydraulically, so that the sealing rings are pulled away from the sealing seats on the valve housing. The above-mentioned expansion elements 18 are components known per se.

The shut-off plate 15 consists of two axially spaced-apart shut-off disks 19, which when the valve is in the closed position can be pressed against the above-mentioned sealing seats on the valve housing 11, likewise by expansion elements 18 as described above.

The sealing rings 17 and shut-off disks 19 are mounted in a rectangular frame 20. This rectangular frame 20, and hence the slide gate 14, is carried on roller bearings within the valve housing 11, in such a way that the bearing rollers 21, 22 hold the slide gate 14 or its frame radially with respect to its direction of movement, shown by the double-headed arrow 23 in FIG. 1, on all sides. In concrete terms, the slide gate 14 or its frame 20 is seated on roller bearings arranged parallel to the movement direction 23 along two opposite narrow sides, namely the lower and upper sides in FIG. 1. On the lower side, the slide gate 14 or its frame 20 is bounded by a tubular member 24 having an outer shape or profile to receive circumferentially spaced bearing rollers 21. Bearing rollers 21 are rotatably disposed in the valve housing 11 and mounted to roll along this tubular member 24, the bearing rollers being arranged in a star-shaped configuration with respect to the long axis 28 of the profile, as shown in FIG. 2. In the exemplary embodiment illustrated here, the tubular member 24 forms the lower side of the rectangular frame 20. Specifically, two roller bearing units 25, only one of which is visible in FIG. 1, are spaced apart along the tubular member 24, in the movement direction 23 of the slide gate 14. Each roller bearing unit 25 comprises two sets 26, 27 of bearing rollers 21 in a star-shaped configuration. Each set of bearing rollers 26 or 27 comprises, as shown in FIG. 2, four bearing rollers 21 uniformly spaced around the circumference of the tubular member 24, so that they lie in two perpendicular planes, each of which forms an angle of about 45° with the slide-gate plane 29.

As an alternative to the embodiment just described, the tubular member 24 can be attached to the upper narrow side or to one broad side of the slide gate.

At the upper narrow side, the slide gate is held by bearing rollers 22 that roll along its broad surface. In concrete terms, the bearing rollers 22 roll along a guide rail in the form of a hollow rectangular member 30. The axes of rotation of the bearing rollers 22 are parallel to the slide-gate plane 29. As in the case of the lower tubular member 24, two bearing roller units, each with two pairs of bearing rollers 31, 32, contact the upper hollow rectangular profile 30; they are likewise spaced apart in the movement direction 23, being situated near the corners of the valve frame 11. The roller bearing units 25 associated with the tubular profile 24 are also situated opposite one another in corner regions of the valve frame 11.

As can clearly be seen in FIG. 2, the bearing rollers 21, like the bearing rollers 22, can each be adjusted individually against the associated longitudinal guide surfaces of the tubular member 24 or hollow rectangular profile 30, so that manufacturing tolerances can be compensated. The bearing rollers 21, like the bearing rollers 22, are rotatably mounted in bearing blocks 33 and 34, respectively. In the exemplary embodiment shown here the bearing blocks 33, 34 are supported against the associated wall of the valve housing 11 by four set screws 35 or 36, respectively, arranged at the corners of an imagined square. The relative position achieved by means of the set screws 35 or 36 is secured by a counter screw 37 or 38 placed between the set screws, in particular in the center of the square. The set screws 35 and 36 are screwed through the wall of the valve housing until the distal end of each makes contact with the associated bearing block 33 or 34. The depth to which each set screw 36, 36 has been screwed in can then be fixed by counter nuts 39 or 40 in the conventional manner.

The set and counter screws are all enclosed on the outside of the valve housing by a removably attached cover 41 or 42, which is fluid-tight to the extent that the housing 11 itself is fluid-tight. Fluid leakage is prevented by ring seals 43 and 44, respectively, incorporated into the edge of the cover that contacts the housing, e.g. in the form of O-rings. Each of the covers 41 and 42 is attached by a fixation screw 45 or 46, which passes through the cover and is screwed into the wall of the valve housing.

The construction described here makes it possible to adjust and secure each bearing roller individually. The slide gate 14 can thus be guided linearly with no bending, and the bearing rollers are so arranged that the slide gate or the slide valve as a whole can be installed in any desired spatial orientation. The slide gate 14 slides without play and without bending in any orientation. The forces needed to propel the slide gate 14 are correspondingly slight, even with a very short movement cycle.

The drive mechanism for the slide gate 14 will now be described with reference to FIG. 3.

The slide gate 14 in the exemplary embodiment shown here is moved back and forth, in the direction of the double-headed arrow 23, by a chain-wheel drive 47. The chain-wheel drive 47 comprises a chain 48 attached to the lower (in FIG. 1 and FIG. 3) narrow side of the slide gate 14, in concrete terms to the lower side of the tubular member 24, and a chain wheel 50 that engages the chain and is operationally connected to an actuator, in particular a hydraulic motor 49. The chain wheel 50 is disposed in a housing 51 that can be flange-mounted, in a fluid-tight manner, to the valve housing 11, in particular to its lower narrow side, and the drive shaft 52 that drives the chain wheel 50 passes through a fluid-tight opening in the chain-wheel housing 51. The hydraulic motor 49 can thus be mounted and removed with no leakage of fluid into the valve housing, including the chain-wheel housing. To permit flange-mounting of the chain-wheel housing 51, the valve housing 11 has an aperture 53 in its lower narrow side into which the chain-wheel housing 51 can be fitted with the interposition of a ring seal 54, in particular in the form of an O-ring, after which the chain-wheel housing can be adjusted with respect to the valve housing 11 and fixed thereto by means of adjustment and fixation screws 55 (see FIG. 1). Preferably four adjustment and fixation screws are provided in an arrangement such that in a plan view of the chain-wheel housing 51 they form the corners of an imagined rectangle.

By means of the adjustment and fixation screws, while maintaining the leakproof seal between the interior of the valve housing 11 and the surroundings, the chain-wheel housing 51 and hence also the chain wheel 50, which projects out of the chain-wheel housing 51 on the side toward the valve housing, can be positioned with respect to the drive chain 48 that is attached to the tubular profile 24 in such a way as to ensure that the chain wheel 50 engages the drive chain 48 practically without play.

As has been explained above, the pipe bridge 16 comprises two sealing rings 17 connected to one another by a compensator that is not described in detail, such that in the open position of the valve the sealing rings 17 are pressed against corresponding sealing seats on the valve housing 11 by the above-mentioned expansion elements 18. The shut-off plate 15 likewise consists of two shut-off disks 19 that can be displaced axially with respect to one another and in the closed position of the valve are likewise pressed against the sealing seats on the valve housing 11 by the expansion elements 18. The sealing rings 17 of the pipe bridge 16 and the shut-off disks 19 of the shut-off plate 15 are held in the frame 20 of the slide gate 14 by radially and axially oriented adjustment screws 56 and 57, respectively, as shown in FIGS. 1 to 3. The radially oriented adjustment screws 56 are slidably apposed to the frame 20 of the slide gate 14 by way of the screw head 58. This arrangement ensures axial guidance of the sealing rings 17 or shut-off disks 19 within the frame 20 of the slide gate 14 during the axial displacement of the sealing rings 17 of the pipe bridge 16 and the shut-off disks 19 of the shut-off plate 15, away from or toward one another, by the expansion elements 18 as described above. That is, this movement is guided by the adjustment screws 56 with heads 58 resting against the frame 20.

The axially oriented adjustment screws 57 are each disposed between the two sealing rings 17 of the pipe bridge 16, or between the two shut-off disks 19 of the shut-off plate 15. They form a stop that determines the maximal extent to which the sealing rings 17 or shut-off disks 19 can approach one another axially. At the same time, they serve for axial centering of the two sealing rings 17 or shut-off disks 19 when these are in the position they occupy during movement of the slide gate, i.e. when they are axially closest together. For this purpose, the axially oriented adjustment screws are screwed into metal blocks 59 disposed between the two sealing rings or shut-off disks, in such a way that they enter the blocks in the axial direction on diametrically opposed sides of the blocks. Each of the metal blocks 59 is part of the frame 20 of the slide gate 14 or is firmly attached to the slide-gate frame 20.

Each sealing ring 17 and each shut-off disk 19 bears radially extending tabs 60, flush with the ring or disk in the axial direction. Between the tabs 60 of the paired sealing rings or paired shut-off disks the above-mentioned expansion elements 18 act. In addition, the radially oriented adjustment screws 56 are disposed at the tabs 60, namely at the tabs 60 that extend perpendicularly toward the sides of the frame 20. For this purpose threaded sleeves 61 are attached to the relevant tabs 60, in particular welded on, so that the radially oriented adjustment screws 56 can be screwed into these sleeves. The radially oriented adjustment screws 56 are fixed in place in the ordinary way, by counter nuts 62.

List of reference numerals
10 Double-disk slide valve
11 Valve housing
12 Pipe supports
13 Flow aperture
14 Slide gate
15 Shut-off plate
16 Pipe bridge
17 Sealing ring
18 Expansion element
19 Shut-off disk
20 (Rectangular) frame of slide gate
21 Bearing roller
22 Bearing roller
23 Double-headed arrow
24 Tubular profile
25 Roller bearing unit
26 Set of bearing rollers
27 Set of bearing rollers
28 Long axis of tubular profile 24
29 Plane of slide gate
30 Hollow rectangular profile
31 Pair of bearing rollers
32 Pair of bearing rollers
33 Bearing block
34 Bearing block
35 Set screw
36 Set screw
37 Counter screw
38 Counter screw
39 Counter nut
40 Counter nut
41 Cover
42 Cover
43 Ring seal
44 Ring seal
45 Fixation screw
46 Fixation screw
47 Chain-wheel drive
48 Drive chain
49 (Hydraulic) motor
50 Chain wheel
51 Chain-wheel housing
52 Drive shaft
53 Aperture
54 Ring seal
55 Adjustment and fixation screw
56 Adjustment screw (radial)
57 Adjustment screw (axial)
58 Screw head 59 Metal block
60 Tab
61 Threaded sleeve
62 Counter nut

I claim:

1. A slide valve apparatus for mounting adjacent a large fluid conduit having an open end, comprising a valve housing (11), a slide gate (14) mounted within the said valve housing (11) and adapted to move transversely of the open end of the large fluid conduit, said slide gate having a shut-off plate (15) on a first side and having a pipe bridge (16) on a second side thereof and forming together an appearance of spectacles and having a first position and a second position, a movable support for said slide gate for moving the slide gate in a path across the open end of the fluid conduit and between the first position with said shut-off plate (15) aligned and engaging the fluid conduit in a closed valve position and in a second position with said pipe bridge (16) aligned with and engaging said fluid conduit in an open conduit position, said movable support for said slide gate including a plurality of roller bearings (21, 22) distributed about said slide gate (14) and radially supporting said slide gate with respect to the movement (23) along said path to selectively align said shut-off plate and said pipe bridge with said conduit, and said movable support including an elongated guide member (24) defining elongated guide surfaces for said rollers on the path across the fluid conduit, said bearing rollers being rotatably mounted in said valve housing (11) and located in rolling engagement with said guide surfaces, said bearing rollers (21) being arranged in an substantially star configuration about an axis parallel to the path of said slide gate.

2. The slide valve apparatus of claim 1 wherein said housing including a frame structure with first and second slide support members located on opposite sides of said shut-off plate and said pipe bridge, and said roller bearings include roller bearings disposed parallel to the path and thereby direction of movement and including roller bearings secured to the first and second slide support members.

3. The slide valve apparatus of claim 1 wherein said plurality of said roller bearings includes at least one set (26 or 27) of two roller bearing units (25) spaced longitudinally along said axis of said guide member.

4. The slide valve apparatus of claim 3 wherein said elongated guide member includes an outer circumference and each set of bearing rollers (26, 27) comprising at least four roller bearings (21) uniformly spaced about the circumference of said guide member, said four bearing rollers of each set being circumferentially spaced and arranged in two planes perpendicular to one another whereby each roller forms an angle of approximately 45° with a plane (29) parallel to the slide gate.

5. The slide valve apparatus of claim 1 wherein said support includes a second guide member located to the opposite side of said slide gate from said first named elongated guide member and having two flat surfaces parallel to the path of said slide gate, said plurality of roller bearings (63) including second roller bearings rotatably mounted in said housing and having second roller bearings rolling against said flat surfaces.

6. The slide valve apparatus of claim 5 wherein said second guide member is a tubular member having a rectangular profile (30) including said two flat parallel surfaces parallel to the path of said gate, said second bearing rollers (63) engaging said parallel surfaces.

7. The slide valve apparatus of claim 5 wherein at least two of said second bearing roller units (63) are spaced apart from one another along the path of the slide gate (14), each said roller unit comprising at least two pairs of bearing rollers (31, 32).

8. The slide valve apparatus of claim 1 including an individual adjustable support for each bearing roller for adjusting the roller with respect to the engaged guide surfaces.

9. The slide valve apparatus of claim 8 wherein each bearing roller includes a bearing roller block (33, 34), at least two set of screws (35, 26) spaced apart from one another and secured to the valve housing (11) and engages against said bearing block, and an interposed counterscrew (37, 38) supported against the bearing block (33, 34).

10. The slide valve apparatus of claim 9 including a fluid enclosure (ring seals 43, 44) having a removably attached cover (41, 42) secured to the valve housing and enclosing said set screws (35, 36) and the counterscrews (37, 38).

11. The slide valve apparatus of claim 1 including a chain wheel drive (47) having a chain (48) attached to the slide gate, a chain wheel so engaging said chain, a drive mechanism (4) operatively connected to said chain wheel (50), chain-wheel housing (51) being flanged-mounted in a fluid type connection to the valve housing (11) and enclosing said chain-wheel drive, and a drive shaft (52) operatively connected to said chain wheel (50) and passing through a fluid-tight opening in the chain-wheel housing (51) and connected to said drive mechanism.

12. The slide valve apparatus of claim 11 including a movable drive support connected to the chain-wheel housing and to the valve housing and locating the chain wheel (50) projecting from the chain wheel housing (51) within the valve housing, said movable drive support is mounted to be positioned over a selected range with respect to the drive chain (48) with said fluid-tight seal to the valve housing (11).

13. The slide valve apparatus of claim 12 wherein the valve housing (11) includes an aperture (53), the flange mounted chain-wheel housing (51) being secured to said valve housing at said aperture, a ring seal (54) located between said valve housing and flanged-mounted chain wheel housing to enable adjustment of the chain-wheel housing with respect to the valve housing (11).

14. The slide valve apparatus of claim 1 wherein said pipe bridge (16) comprising two sealing rings (17) spaced from each other, a compensator connected to said rings and having sealing seats aligned with said conduit in said second position, said sealing rings being aligned with said sealing seats in said valve housing (11) in said second position, and expander means (expansion elements 18) operable to press said sealing rings against said valve seats, and wherein said shut-off plate (15) comprises two shut-off disks, an expander means (expansion elements 18) coupled to said shut-off disks and operably pressing said disks against said sealing seats of said valve housing (11) in said first position, an outer frame 20, said sealing rings (17) of the pipe bridge (16) and said shut-off disks (19) of the shut-off plate (15) being mounted within said frame (20) of the slide gate (14), and radially and axially oriented adjustment screws (56, 57, respectively) supporting said pipe bridge (60) and said shut-off disk to said frame.

15. The slide valve apparatus of claim 14 wherein all said adjustment screws includes screw heads, said radially oriented adjustment screws slidably engage the frame (20) of the slide gate (14) by the location of the screw head (58).

16. The slide valve apparatus of claim 14 wherein said axially oriented adjustment screws (57) includes screws located between the two sealing rings (17) of the pipe bridge (16) and screws located between the two shut-off disk (19) of the shut-off plate (15), said axially oriented adjustment screw forming stops for the sealing rings and the disks and establishes the maximum extent to which the sealing rings (17) can approach each other and shut-off disks (19) can approach each other.

* * * * *